(12) United States Patent
Savkli

(10) Patent No.: US 10,936,965 B2
(45) Date of Patent: Mar. 2, 2021

(54) METHOD AND APPARATUS FOR ANALYSIS AND CLASSIFICATION OF HIGH DIMENSIONAL DATA SETS

(71) Applicant: The Johns Hopkins University, Baltimore, MD (US)

(72) Inventor: Cetin Savkli, Annapolis, MD (US)

(73) Assignee: The John Hopkins University, Baltimore, MD (US)

( * ) Notice: Subject to any disclaimer, the term of this patent is extended or adjusted under 35 U.S.C. 154(b) by 355 days.

(21) Appl. No.: 15/725,335

(22) Filed: Oct. 5, 2017

(65) Prior Publication Data

US 2018/0101783 A1   Apr. 12, 2018

Related U.S. Application Data

(60) Provisional application No. 62/405,427, filed on Oct. 7, 2016.

(51) Int. Cl.
| | | |
|---|---|---|
| *G06N 7/00* | (2006.01) | |
| *G06F 17/15* | (2006.01) | |
| *G06F 16/35* | (2019.01) | |
| *G06K 9/62* | (2006.01) | |

(52) U.S. Cl.
CPC ........... *G06N 7/005* (2013.01); *G06F 16/355* (2019.01); *G06F 17/15* (2013.01); *G06K 9/6224* (2013.01); *G06K 9/6284* (2013.01)

(58) Field of Classification Search
None
See application file for complete search history.

(56) References Cited

U.S. PATENT DOCUMENTS

| | | | |
|---|---|---|---|
| 7,007,001 B2 | 2/2006 | Oliver et al. | |
| 7,548,856 B2* | 6/2009 | Thiesson | G06K 9/6226 704/245 |
| 7,853,432 B2 | 12/2010 | Hero, III et al. | |
| 7,945,668 B1* | 5/2011 | Nucci | G06N 20/00 709/225 |
| 8,301,486 B1* | 10/2012 | Marsten | G06Q 30/00 705/7.31 |
| 9,519,705 B2 | 12/2016 | King et al. | |
| 9,544,121 B2 | 1/2017 | Balraj et al. | |
| 2005/0187742 A1* | 8/2005 | Collodi | G06F 30/20 703/2 |
| 2009/0296719 A1* | 12/2009 | Maier | H04L 45/123 370/400 |
| 2009/0307660 A1* | 12/2009 | Srinivasan | G06F 8/314 717/114 |
| 2011/0258045 A1* | 10/2011 | Chickering | G06Q 30/00 705/14.53 |

(Continued)

*Primary Examiner* — Gregory J Toatley, Jr.
*Assistant Examiner* — Brandon J Becker
(74) *Attorney, Agent, or Firm* — Sung T. Kim

(57) ABSTRACT

A method executable via operation of configured processing circuitry may include constructing a mutual information graph for categorical data with respect to observed attributes of a plurality of entities described in terms of respective ones of the observed attributes by the categorical data, determining a clique tree correlating attributes having at least a threshold level of mutual dependence among the observed attributes, and determining a normality rating for an entity relative to the plurality of entities based on the clique tree.

20 Claims, 13 Drawing Sheets

(56) References Cited

U.S. PATENT DOCUMENTS

2012/0066172 A1* 3/2012 Jebara .................. G06K 9/6297
                                                    706/52
2012/0213227 A1* 8/2012 Jaeger ................. H04W 40/248
                                                    370/392
2017/0249535 A1   8/2017 Swaminathan et al.

* cited by examiner

METHOD AND APPARATUS FOR ANALYSIS AND CLASSIFICATION OF HIGH DIMENSIONAL DATA SETS

CROSS-REFERENCE TO RELATED APPLICATIONS

This application claims the benefit of U.S. Provisional Application No. 62/405,427 filed on Oct. 7, 2016, the entire contents of which are hereby incorporated herein by reference.

TECHNICAL FIELD

Example embodiments generally relate to techniques for classifying data or entities within large data sets and, in particular, relate to apparatuses (and/or methods executable by configured apparatuses) that are capable of analyzing high dimensional data sets to determine whether a particular entity associated with the data is normal, classify the entity, or identify similar entities.

BACKGROUND

With the rapid growth of categorical data available for analysis, the need for robust statistical approaches is becoming ever more critical. Unlike numerical data (such as weather or astronomical data), much of the data found in social networks, and the web in general, is categorical in nature. Categorical data is data that is collected in groups or categories. While methods for analysis of numerical data are well established, methods used for analysis of categorical data are more varied and still developing.

One of the challenges in the analysis of categorical data is a lack of a natural distance metric that most statistical learning algorithms rely on. While the lack of a natural distance metric is a problem, it is also known that as the dimensionality of attribute space increases the distance metrics become less and less useful, a fact that is also known as the curse of dimensionality. The curse of dimensionality implies that in high dimensions most of the data becomes equally anomalous. Therefore, determining what constitutes an anomaly becomes a challenging task since, as the dimensionality increases, all data tends to appear to be anomalous.

The inability to reliably identify anomalies has practical consequences as human inspection of anomalies is a time-consuming activity. Categorical data, such as a cyber or financial transactions, can easily comprise dozens of attributes. Reliance on rule based or ground truth based classification approaches can be fragile, as anomalies may be subtle and the anomalies may not form a cohesive class. Such approaches effectively lead to a classification system that can primarily be used to detect predefined event classes. Therefore, it may be desirable to develop robust analytic approaches that do not require ground truth, do not rely on a distance metric, and that can handle the high dimensionality of the categorical data.

BRIEF SUMMARY OF SOME EXAMPLES

Some example embodiments may enable the provision of a probabilistic approach to data representation that addresses the challenges described above.

In one example embodiment, an apparatus including processing circuitry configured to execute instructions that, when executed, cause the apparatus to perform various operations may be provided. The operations may include constructing a mutual information graph for categorical data with respect to observed attributes of a plurality of entities described in terms of respective ones of the observed attributes by the categorical data, determining a clique tree correlating attributes having at least a threshold level of mutual dependence among the observed attributes, and determining a normality rating for an entity relative to the plurality of entities based on the clique tree.

In another example embodiment, a method may be provided. The method may include constructing a mutual information graph for categorical data with respect to observed attributes of a plurality of entities described in terms of respective ones of the observed attributes by the categorical data, determining a clique tree correlating attributes having at least a threshold level of mutual dependence among the observed attributes, and determining a normality rating for an entity relative to the plurality of entities based on the clique tree.

In still other examples, another method may be provided. The method may include utilizing a correlation metric with respect to observed attributes of a plurality of entities described in terms of respective ones of the observed attributes in categorical data, determining a clique tree defining entity groupings with correlated attributes based on the correlation metric, and determining a normality rating for an entity relative to the plurality of entities based on the clique tree.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
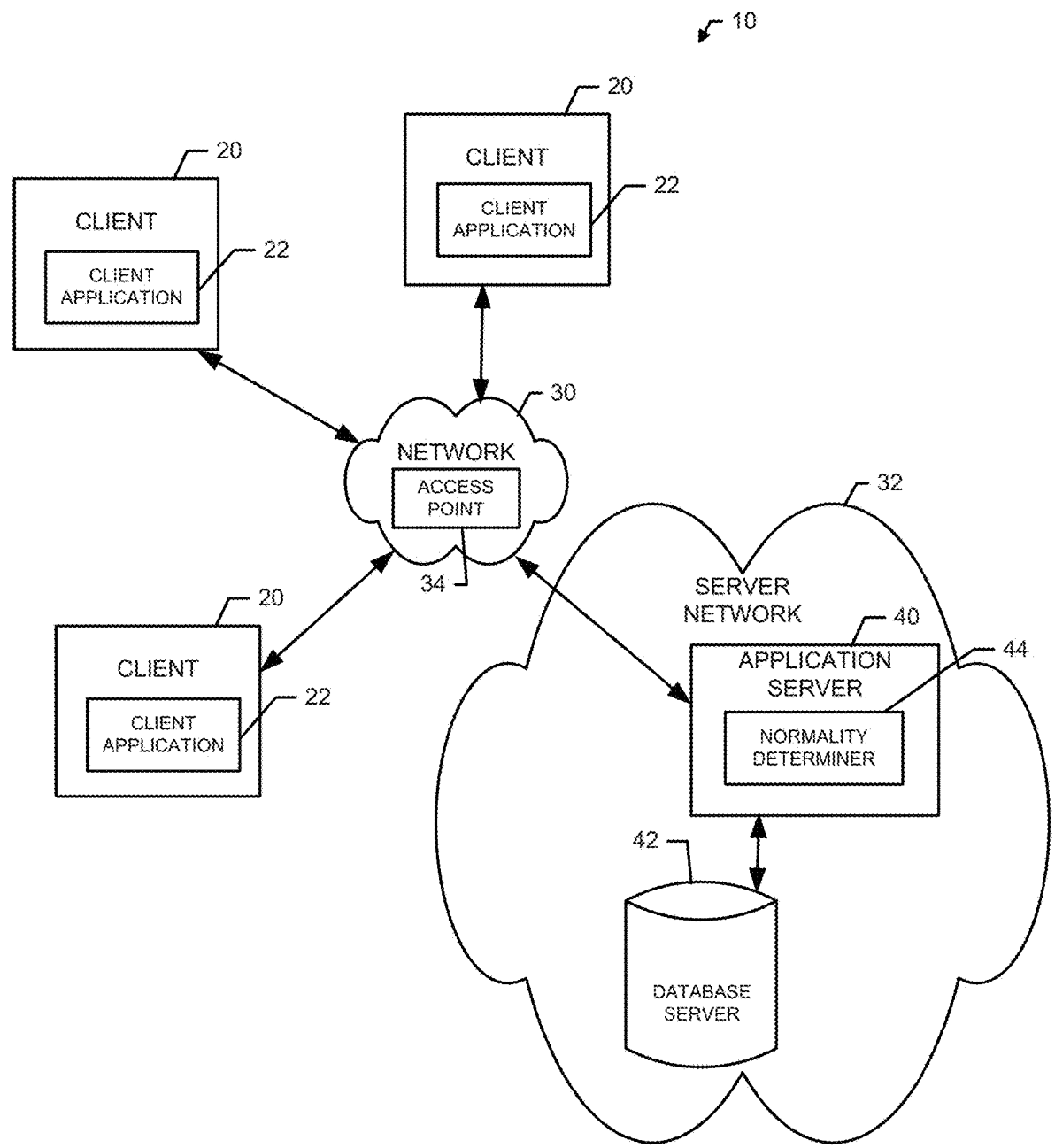
FIG. 1 illustrates a functional block diagram of a system that may be useful in connection with analysis and/or classification of high dimensional data sets according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. As used herein, the term "entity" should be understood to correspond to a record, a product, a container, a person, an object, a living thing, a message, a connection, or any other thing that is characterized by a plurality of attributes as categorical data.

As indicated above, some example embodiments may relate to the provision of analysis and classification capabilities in challenging environments. Consider, for example, a shipping port that receives many thousands of shipping containers each day. Customs agents may be responsible for reviewing records associated with the shipping containers to attempt to identify those that are suspicious relative to importation of illegal goods, dangerous materials, or other anomalies worthy of attention. When one considers that the shipping containers have the potential for massively large differences in contents and the attributes of those contents, it can be appreciated that the records associated with the shipping containers can be very difficult to review for a determination as to which shipping containers to inspect more closely. As such, some example embodiments may provide a tool for identifying whether a particular entity (i.e., one of the records) is a normal record relative to other records that have been seen in the past (i.e., a known data set). Example embodiments may also, or alternatively, be configured to determine a classification of the record from a qualitative standpoint (i.e., whether the record is good or bad). In such examples, example embodiments may effectively determine whether the record is normal for a data set of good records (e.g., records associated with legal goods) and therefore good, or normal for a data set of bad records (e.g., records associated with illegal goods) and therefore bad. Moreover, example embodiments may be able to identify data most similar to the data set of the record by indexing the data as described in greater detail below.

The examples above relate specifically to inspection of goods or records associated with the goods. Other examples could be applied in different contexts where categorical data is involved. For example, people, animals, plants, or virtually any other object that has a wide variety of attributes could be considered to determine whether the attributes associated with a particular entity being considered (e.g., an entity under test or consideration) is an anomaly relative to other entities of the category. The ability may then exist, in short order and without any other knowledge required beyond the data that is descriptive of the entities themselves, to detect anomalies and classify entities. The detection and classification may be used to order more detailed inspections of anomalous entities, to evaluate or grade entities, or to instruct personnel to take a particular action relative to the entity under test.

As discussed above, as the number of attributes increase for categorical data, all data tends to look anomalous. Thus, determining whether any particular set of data (or entity) corresponds to data that has been seen before or is anomalous can become very difficult. Example embodiments enable use of a probabilistic approach to identifying anomalous or normal data even in very high dimensional contexts. Accordingly, example embodiments may be employed to find, with very high accuracy, data sets that are either normal or abnormal to determine a measure of probability of data never seen before. In this regard, example embodiments may build a joint probability distribution by taking into account independencies of the data within a given data set using the concept of mutual information.

This approach can enable analysis and/or classification of data not only in the context of border security for shipping containers, but in a multitude of other contexts. For example, example embodiments can analyze data or records associated with financial transactions, electronic communications, people, products, connections, records, or any other data sets with high numbers of attributes for determining a measure of normality of a particular entity (e.g., a particular set of data or record). The particular entity may therefore be analyzed relative to a likelihood that the particular entity is normal relative to other entities that have been encountered in the past. If the other entities have a particular quality (e.g., good entities or bad entities), then the measure of normality for being good or bad can indicate whether the particular entity is likely to be good or bad. Thus, the particular entity can be analyzed for detecting fraud, detecting illegal transactions or activities, identifying people or things having particular qualitative aspects, and/or the like.

An example embodiment of the invention will now be described in reference to FIG. 1. As shown in FIG. 1, a system 10 according to an example embodiment may include one or more client devices (e.g., clients 20). Notably, although FIG. 1 illustrates three clients 20, it should be appreciated that a single client or many more clients 20 may be included in some embodiments and thus, the three clients 20 of FIG. 1 are simply used to illustrate a potential for a multiplicity of clients 20 and the number of clients 20 is in no way limiting to other example embodiments. In this regard, example embodiments are scalable to inclusion of any number of clients 20 being tied into the system 10. Furthermore, in some cases, some embodiments may be practiced in connection with a single client connected to the system 10.

The example described herein will be related to an asset comprising a programmed computer or analysis terminal to illustrate one example embodiment. However, it should be appreciated that example embodiments may also apply to any asset including, for example, any programmable device that is capable of interacting with data received from portions of a network 30 (e.g., via a network access point 34) to monitor the communications between the network access point 34 and various network devices that may gather or generate data, or otherwise execute applications on or in association with the network 30 as described herein.

The clients 20 may, in some cases, each be associated with a single organization, department within an organization, or location (i.e., with each one of the clients 20 being associated with an individual analyst of an organization, department or location). However, in some embodiments, each of the clients 20 may be associated with different corresponding individuals, locations, departments or organizations. For example, among the clients 20, one client may be associated with a first facility of a first organization and one or more of the other clients may be associated with a second facility of either the first organization or of another organization.

Each one of the clients 20 may include or otherwise be embodied as computing device (e.g., a computer, a network access terminal, a personal digital assistant (PDA), cellular phone, smart phone, or the like) capable of communication with or over the network 30, and generating, storing, gathering or otherwise communicating data associated with an entity (e.g., a record, a product, a container, a person, a connection, or other thing that is characterized by a plurality of attributes as categorical data). As such, for example, each one of the clients 20 may include (or otherwise have access to) memory for storing instructions or applications for the performance of various functions and a corresponding processor for executing stored instructions or applications. Each one of the clients 20 may also include software and/or corresponding hardware for enabling the performance of the respective functions of the clients 20 as described below. In an example embodiment, one or more of the clients 20 may include a client application 22 configured to operate in accordance with an example embodiment of the present invention. In this regard, for example, the client application 22 may include software for enabling a respective one of the clients 20 to communicate with the network 30 for requesting and/or receiving information and/or services via the network 30. Moreover, in some embodiments, the information or services that are requested via the network may be provided in a software as a service (SaaS) environment. The information or services receivable at the client applications 22 may include deliverable components (e.g., downloadable software to configure the clients 20, or information for consumption/processing at the clients 20). As such, for example, the client application 22 may include corresponding executable instructions for configuring the client 20 to provide corresponding functionalities for processing instructions to execute a particular application that can be monitored and classified remotely as described in greater detail below.

The client application 22 may be one of a selected group of applications executable at the clients 20, and the client applications on each device may be the same or different. Moreover, the clients 20 may execute the same or different applications simultaneously or at different respective times. Each respective one of various distinct examples of client applications 22 may have distinct communications or handle distinct transactions or data, or the client applications 22 may all be engaged in similar activities. Regardless, the communications associated therewith may either generate data for consideration according to example embodiments or evaluate data being considered according to example embodiments.

The network 30 may be a data network, such as a local area network (LAN), a metropolitan area network (MAN), a wide area network (WAN) (e.g., the Internet), and/or the like, which may couple the clients 20 to devices such as processing elements (e.g., personal computers, server computers or the like) and/or databases. Communication between the network 30, the clients 20 and the devices or databases (e.g., servers) to which the clients 20 are coupled may be accomplished by either wireline or wireless communication mechanisms and corresponding communication protocols.

In an example embodiment, devices to which the clients 20 may be coupled via the network 30 may include one or more application servers (e.g., application server 40), and/or a database server 42, which together may form respective elements of a server network 32. Although the application server 40 and the database server 42 are each referred to as "servers," this does not necessarily imply that they are embodied on separate servers or devices. As such, for example, a single server or device may include both entities and the database server 42 could merely be represented by a database or group of databases physically located on the same server or device as the application server 40. The application server 40 and the database server 42 may each include hardware and/or software for configuring the application server 40 and the database server 42, respectively, to perform various functions. As such, for example, the application server 40 may include processing logic and memory enabling the application server 40 to access and/or execute stored computer readable instructions for performing various functions. In an example embodiment, one function that may be provided by the application server 40 may be the provision of access to information and/or services related to operation of the terminals or computers with which the clients 20 are associated. For example, the application server 40 may be configured to provide for storage of information (e.g., in the database server 42) descriptive of certain data sets including entities previously encountered within a particular context. The information may also or alternatively include a program or series of executable files and/or instructions that are executable for analysis using a tool of an example embodiment. The application server 40 may host functionality for analyzing received data associated with an entity in accordance with an example embodiment. Alternatively or additionally, the application server 40 may be configured to provide analytical tools for use by the clients 20 to conduct such analysis in accordance with example embodiments.

In some embodiments, for example, the application server 40 may therefore include an instance of normality determiner 44 comprising stored instructions for handling activities associated with practicing example embodiments as described herein. However, it should be appreciated that the normality determiner 44 could be a standalone device in some cases, so it need not be a part of a server or a server network. In some cases, the normality determiner 44 may be employed to analyze or monitor entities stored, generated or otherwise provided in association with the clients 20 by being instantiated thereat in the form of one of the client applications 22. However, the client applications 22 could alternatively provide entities for analysis by the normality determiner 44 at a central location, or in any other suitable configuration.

In an example embodiment, the application server 40 may include or have access to memory (e.g., internal memory or the database server 42) for storing instructions or applications for the performance of various functions and a corresponding processor for executing stored instructions or applications. For example, the memory may store an instance of the normality determiner 44 configured to operate in accordance with an example embodiment of the present invention. In this regard, for example, the normality determiner 44 may include software for enabling the application server 40 to communicate with the network 30 and/or the clients 20 for the provision and/or receipt of information associated with activities performed in the network 30 or external activities, objects, transactions or the like that may be associated with an entity and can be analyzed and/or classified as described herein.

Figure 2:
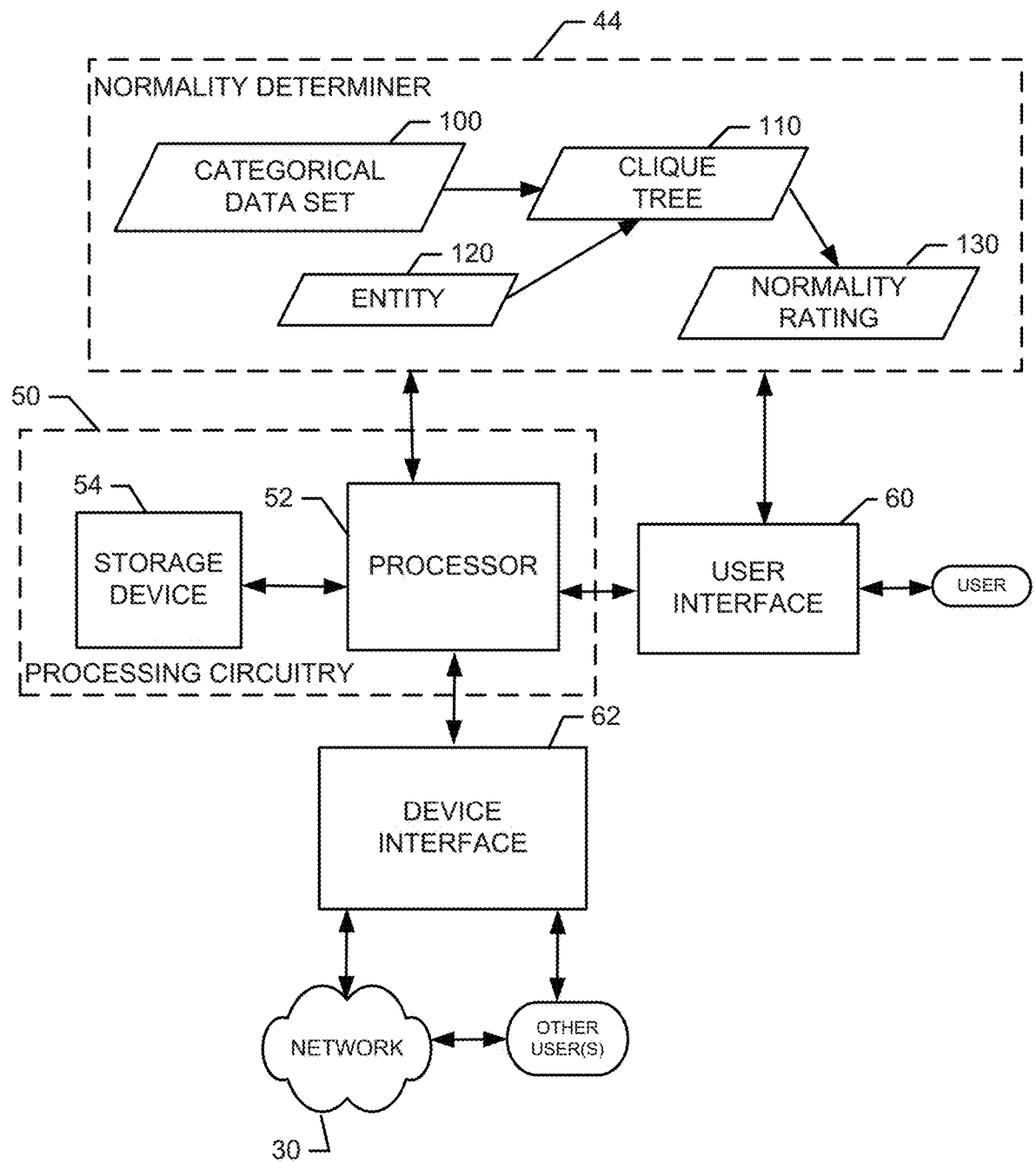
FIG. 2 illustrates a functional block diagram of an apparatus that may be useful in connection with analysis and/or classification of high dimensional data sets according to an example embodiment.

An example embodiment of the invention will now be described with reference to FIG. 2. FIG. 2 shows certain elements of an apparatus for provision of the normality determining capabilities described herein according to an example embodiment. The apparatus of FIG. 2 may be employed, for example, on a device such as, for example, a network device, server, proxy, or the like (e.g., the application server 40 of FIG. 1) at which the normality determiner 44 may be instantiated. Alternatively, embodiments may be employed on a combination of devices. Accordingly, some embodiments of the present invention may be embodied wholly at a single device (e.g., the application server 40) or in a distributed environment (e.g., at a plurality of servers of the server network 32 and/or at clients 20). Furthermore, it should be noted that the devices or elements described below may not be mandatory and thus some may be omitted in certain embodiments.

Referring now to FIG. 2, an apparatus for provision of normality determining for analyzing entities in accordance with an example embodiment is provided. The apparatus may be an embodiment of the normality determiner 44 or a device hosting the normality determiner 44. As such, configuration of the apparatus as described herein may transform the apparatus into the normality determiner 44. In an example embodiment, the apparatus may include or otherwise be in communication with processing circuitry 50 that is configured to perform data processing, application execution and other processing and management services according to an example embodiment of the present invention. In one embodiment, the processing circuitry 50 may include a storage device 54 and a processor 52 that may be in communication with or otherwise control a user interface 60 (which may be optional) and a device interface 62. As such, the processing circuitry 50 may be embodied as a circuit chip (e.g., an integrated circuit chip) configured (e.g., with hardware, software or a combination of hardware and software) to perform operations described herein. However, in some embodiments, the processing circuitry 50 may be embodied as a portion of a server, computer, laptop, workstation or even one of various mobile computing devices. In situations where the processing circuitry 50 is embodied as a server or at a remotely located computing device, the user interface 60 (if employed at all) may be disposed at another device (e.g., at a computer terminal or client device such as one of the clients 20) that may be in communication with the processing circuitry 50 via the device interface 62 and/or a network (e.g., network 30).

The user interface 60 (if employed) may be in communication with the processing circuitry 50 to receive an indication of a user input at the user interface 60 and/or to provide an audible, visual, mechanical or other output to the user. As such, the user interface 60 may include, for example, a keyboard, a mouse, a joystick, a display, a touch screen, a microphone, a speaker, a cell phone, or other input/output mechanisms. In embodiments where the apparatus is embodied at a server or other network entity, the user interface 60 may be limited or even eliminated in some cases. Alternatively, as indicated above, the user interface 60 may be remotely located. In some cases, the user interface 60 may also include a series of web pages or interface consoles generated to guide the user through various options, commands, flow paths and/or the like for control of or interaction with the normality determiner 44. The user interface 60 may also include interface consoles or message generation capabilities to send instructions (e.g., to inspect or otherwise further interrogate a particular entity), warnings, alarms, etc., and/or to provide an output that clearly indicates a degree of normality of data, a qualitative assessment (e.g., good, bad, correct, erroneous, legal, illegal, etc.), or an index of data to illustrate similar data to that which is associated with the entity.

The device interface 62 may include one or more interface mechanisms for enabling communication with other devices and/or networks. In some cases, the device interface 62 may be any means such as a device or circuitry embodied in either hardware, software, or a combination of hardware and software that is configured to receive and/or transmit data from/to a network and/or any other device or module in communication with the processing circuitry 50. In this regard, the device interface 62 may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods. In situations where the device interface 62 communicates with a network, the network may be any of various examples of wireless or wired communication networks such as, for example, data networks like a Local Area Network (LAN), a Metropolitan Area Network (MAN), and/or a Wide Area Network (WAN), such as the Internet.

In an example embodiment, the storage device 54 may include one or more non-transitory storage or memory devices such as, for example, volatile and/or non-volatile memory that may be either fixed or removable. The storage device 54 may be configured to store information, data, applications, instructions or the like for enabling the apparatus to carry out various functions in accordance with example embodiments of the present invention. For example, the storage device 54 could be configured to buffer input data for processing by the processor 52. Additionally or alternatively, the storage device 54 could be configured to store instructions for execution by the processor 52. As yet another alternative, the storage device 54 may include one of a plurality of databases (e.g., database server 42) that may store a variety of files, contents or data sets. Among the contents of the storage device 54, applications (e.g., client application 22 or service application) may be stored for execution by the processor 52 in order to carry out the functionality associated with each respective application.

The processor 52 may be embodied in a number of different ways. For example, the processor 52 may be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. In an example embodiment, the processor 52 may be configured to execute instructions stored in the storage device 54 or otherwise accessible to the processor 52. As such, whether configured by hardware or software methods, or by a combination thereof, the processor 52 may represent an entity (e.g., physically embodied in circuitry) capable of performing operations according to embodiments of the present invention while configured accordingly. Thus, for example, when the processor 52 is embodied as an ASIC, FPGA or the like, the processor 52 may be specifically configured hardware for conducting the operations described herein. Alternatively, as another example, when the processor 52 is embodied as an executor of software instructions, the instructions may specifically configure the processor 52 to perform the operations described herein.

In an example embodiment, the processor 52 (or the processing circuitry 50) may be embodied as, include or otherwise control the normality determiner 44, which may be any means such as a device or circuitry operating in accordance with software or otherwise embodied in hardware or a combination of hardware and software (e.g., processor 52 operating under software control, the processor 52 embodied as an ASIC or FPGA specifically configured to perform the operations described herein, or a combination thereof) thereby configuring the device or circuitry to perform the corresponding functions of the normality determiner 44 as described below.

The normality determiner 44 may be configured to analyze a categorical data set 100 to generate a clique tree 110. As described in greater detail below, the clique tree 110 may be generated based on construction of a mutual information graph in categorical attribute space that identifies cliques or groups of attributes that have strong mutual dependence. The clique tree 110 may then be used to analyze an entity 120 (e.g., data from the categorical data set 100 or data that is to be compared to the categorical data set 100) to determine a normality rating 130 for the entity 120 relative to the categorical data set 100. The clique tree 110 may be used to infer probability of data that has never been observed before (and therefore also probability that the data is normal and routine relative to prior observations). Thus, the clique tree 110 is effectively a tool for anomaly detection within a high dimensional data set context. However, as will be seen below, the clique tree 110 is generated directly from the categorical data set 100 no matter what data the categorical data set 100 represents. Accordingly, for any new data set, a clique tree 110 can be generated, and anomaly detection can be accomplished using Bayesian learning to maximize the probability of observed data while providing inference capability for previously unseen data.

The normality rating 130 may indicate a degree of relative normalcy for the entity 120 with respect to the other data of the categorical data set 100. Thus, for example, the normality rating 130 may effectively have a dependency on a quality that is shared by or inherent to the categorical data set 100 if the categorical data set 100 is selected to include data that corresponds to entities that have the shared or inherent quality. As such, if all of the entities of the categorical data set 100 are positive or good exemplars, then the normality rating 130 may be correlated to positivity or goodness of the entity 120 within the same context. In such an example, a high normality rating 130 may indicate a high likelihood that the entity 120 is also positive or good for the quality in question. If, to the contrary, the entities of the categorical data set 100 are negative or bad exemplars, then the normality rating 130 may be correlated to negativity or badness of the entity 120 within the same context. In such an example, a high normality rating 130 may indicate a high likelihood that the entity 120 is also negative or bad for the quality in question. Accordingly, the normality rating 130 indicates the degree to which the entity 120 is a normal exemplar or is normal relative to the other entities that make up of the categorical data set 100.

The correlation of normality rating 130 to an indication of normalcy or abnormality could be set up via any desirable paradigm. Thus, in some paradigms a high normality rating 130 may indicate that the entity 120 is normal relative to the categorical data set 100, and a low normality rating 130 may indicate that the entity 120 is abnormal relative to the categorical data set 100. However, the opposite could alternatively be true in some paradigms. In still other paradigms distance from a reference could be used as the measure of degree or normalcy, or still other methods could be employed.

Construction of a joint probability distribution will now be discussed to demonstrate how the clique tree 110 can be generated and optimized in accordance with an example embodiment. In high dimensional data sets, there is generally insufficient data from which to characterize probabilities; the available data points are spread too thinly over a very large space of possible attribute combinations. However, if it is known that some subsets of the variables are independent from other subsets of variables, a joint probability distribution in a high dimensional space can be decomposed into a product of lower dimensional probabilities. Within low dimensional spaces, the data may be more concentrated and a probability distribution may be successfully derived. Therefore, as the first step in deriving a joint probability distribution, dependencies may be characterized with mutual information. Mutual information may be a useful metric for correlation because of the generality of mutual information in handling categorical and numerical data. However it is possible to carry out the analysis using any other correlation metric as the approach described herein is not tied to (and is therefore independent of) any particular correlation metric. The clique tree 110 (or junction tree) may be derived from the mutual information, and then a probability model may be derived based on an optimal clique tree structure.

For two variables X and Y, the mutual information I(X,Y) is defined by:

$$I(X, Y) = \sum_{x \in X} \sum_{y \in Y} p(x, y) \log\left(\frac{p(x, y)}{p(x)p(y)}\right). \quad (1)$$

Mutual information measures how much knowing one variable determines the value of the other variable. Mutual information is a quantity that is analogous to covariance for numerical variables. A normalized version of the mutual information may be used to establish the degree of dependence between attributes for a data set that includes a plurality of entities that are associated with respective attributes. The normalized mutual information is given by:

$$M(X, Y) = \frac{I(X, Y)}{\min(H(X), H(Y))}, \quad (2)$$

where variable entropy H is defined as:

$$H(X) = -\sum_{x \in X} p(x) \log(p(x)). \quad (3)$$

The normalized mutual information varies between 0 and 1, where 0 indicates independence while 1 implies complete dependence.

Figure 3:
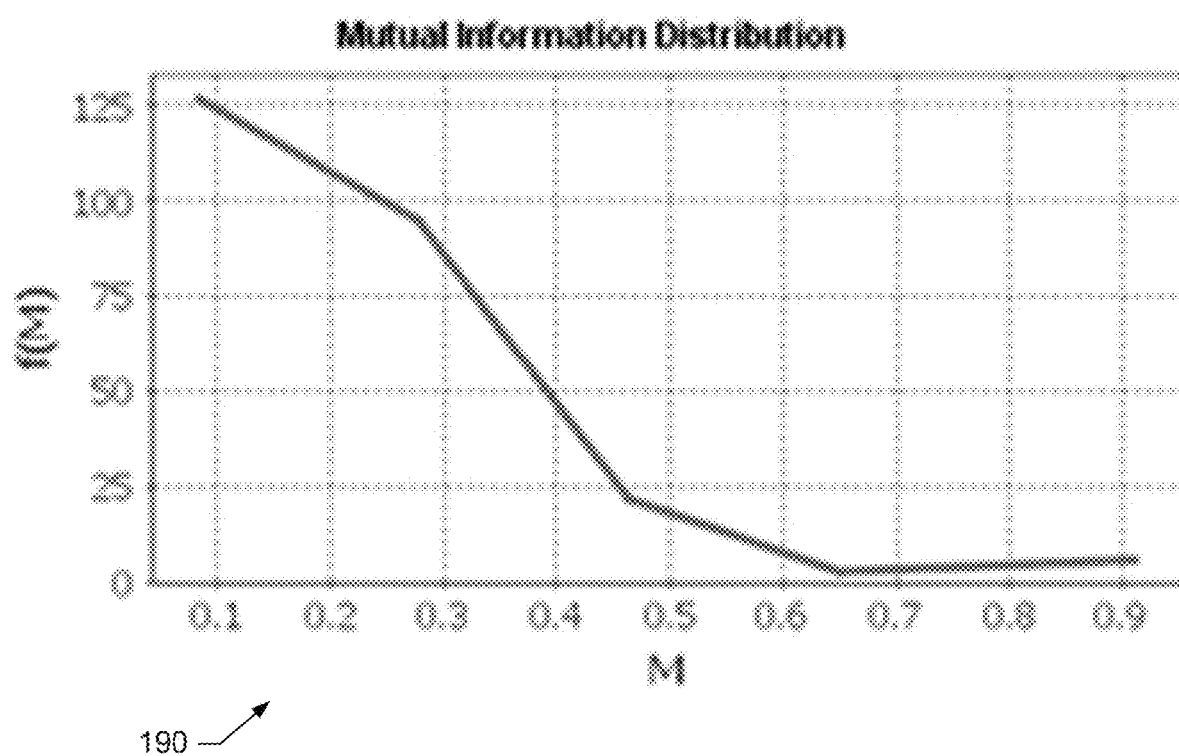
FIG. 3 illustrates an example graph of mutual information distribution in accordance with an example embodiment.

To illustrate an example embodiment, a data set of mushrooms obtained from a public data source may be used. The data set contains 8,124 mushrooms, each characterized by 22 attributes, including color, shape, odor, edibility, etc. For each pair of attributes, normalized mutual information may be calculated or determined. The distribution 190 of normalized mutual information values is shown in FIG. 3 in which the number of attribute pairs (f(M)) is plotted relative to a given mutual information (M). The distribution indicates that there are a small group of attributes with strong mutual dependence (e.g., M close to 1) while most attribute pairs have weaker dependence.

The mutual information results may be recorded as a weighted graph. The 22 attributes of the mushrooms are the graph nodes, and the link between each pair of nodes is weighted with the normalized mutual information of that attribute pair. After creating the mutual information graph, the links may be pruned with a threshold, so that only the links that indicate strong dependency are retained. The threshold can be set anywhere between 0 and 1.

Figure 4:
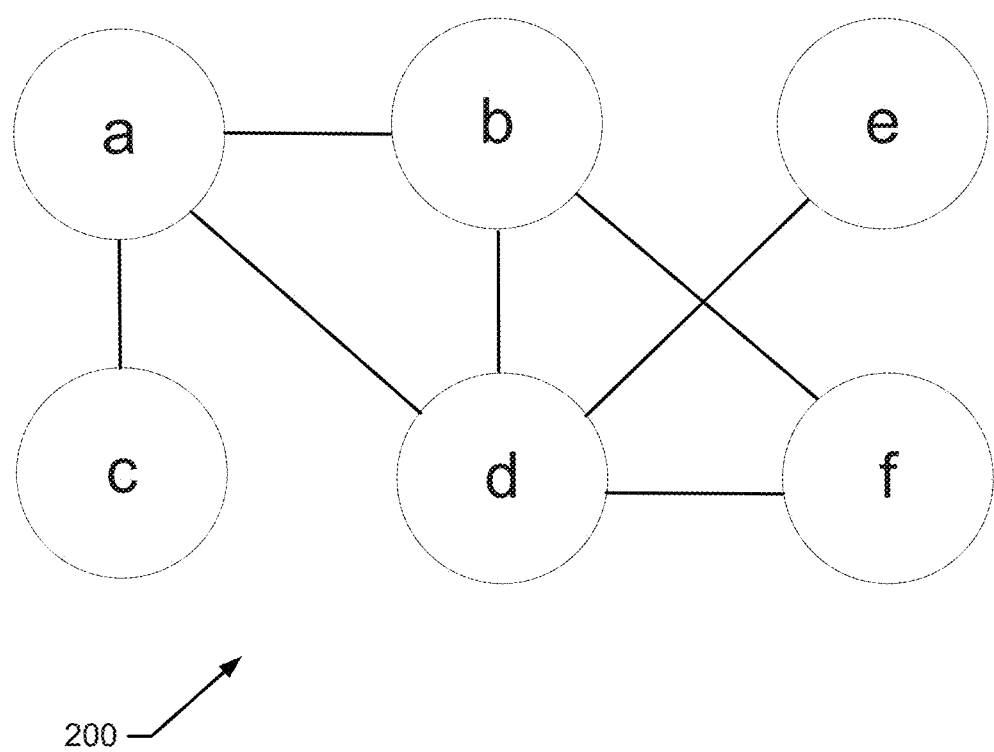
FIG. 4 illustrates a pruned mutual information graph according to an example embodiment.

For greater ease of illustration, rather than considering a data set with 22 attributes, consider instead the derivation of a clique tree and probability model using a hypothetical data set with only six attributes {a, b, c, d, e, f}. An original mutual information graph on these attributes may contain 15 weighted links. Suppose a threshold is chosen so that only the links in FIG. 4 are retained. Thus, FIG. 4 represents a pruned mutual information graph 200 for the six attributes listed above.

Figure 5:
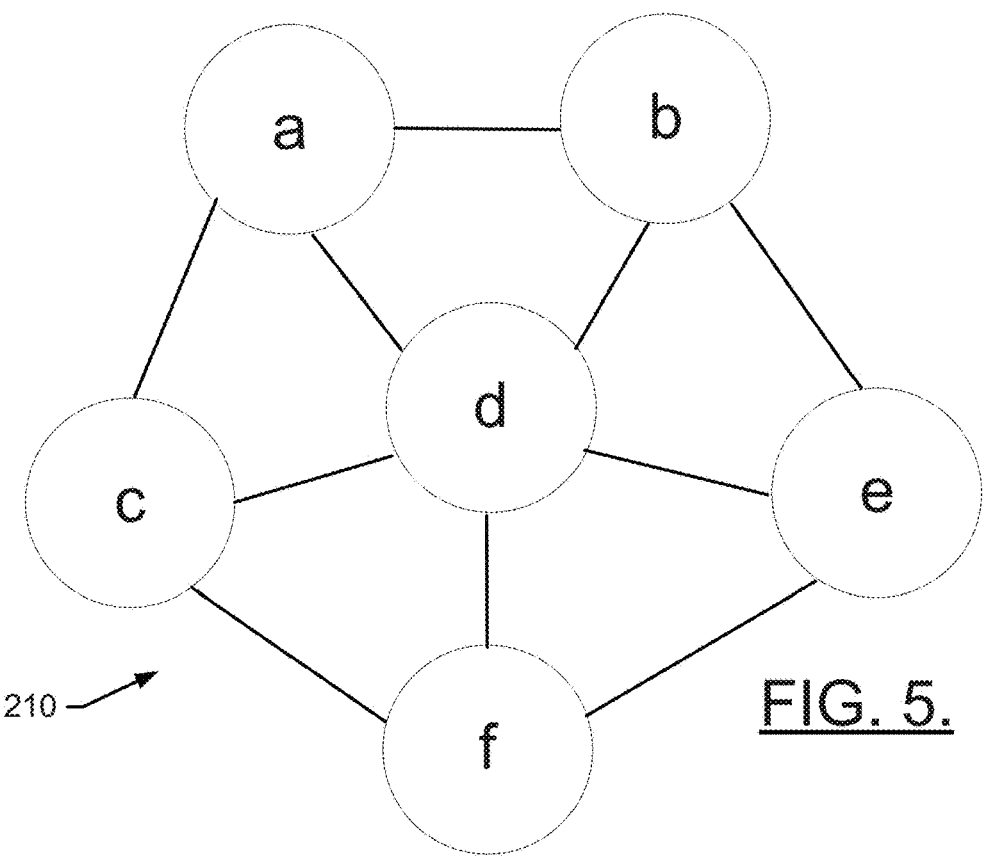
FIG. 5 illustrates an example of a chordless cycle according to an example embodiment.
Figure 6:
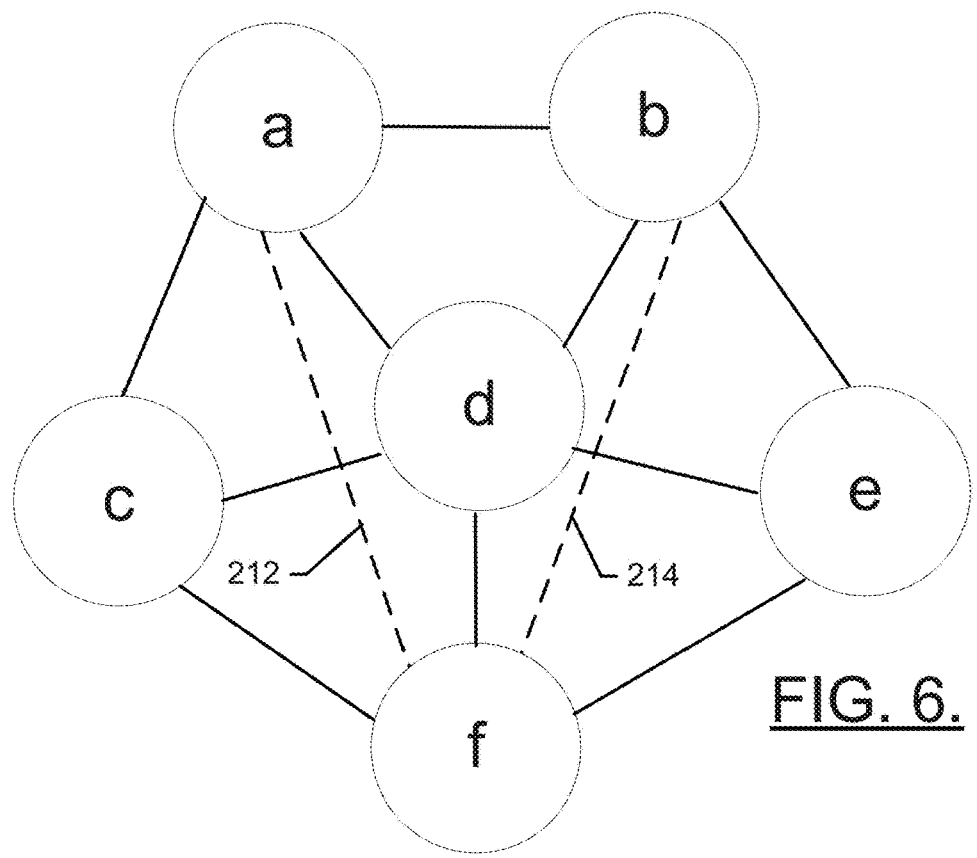
FIG. 6 illustrates an example of a chordless cycle that has been fixed according to an example embodiment.

From the pruned mutual information graph 200 of FIG. 4, the clique tree 110 (for this data set) can be constructed. To construct the clique tree 110, which will be used in modeling a probability distribution, the first step may be to find chordless cycles in the pruned mutual information graph and fix them. This is a necessary condition for the clique tree 110 to satisfy the running intersection property, which guarantees that the clique tree 110 will provide a joint probability distribution that is normalized. A chordless cycle is a cycle such that nodes on the periphery have no direct connection to each other except for the nodes which are adjacent in the cycle. To illustrate, consider the pentagon-shaped cycle in FIG. 5 as an example of a chordless cycle 210. Fixing the chordless cycle 210 can be accomplished by introducing the links a-f (i.e., link 212) and b-f (i.e., link 214) shown in FIG. 6.

Figure 7:
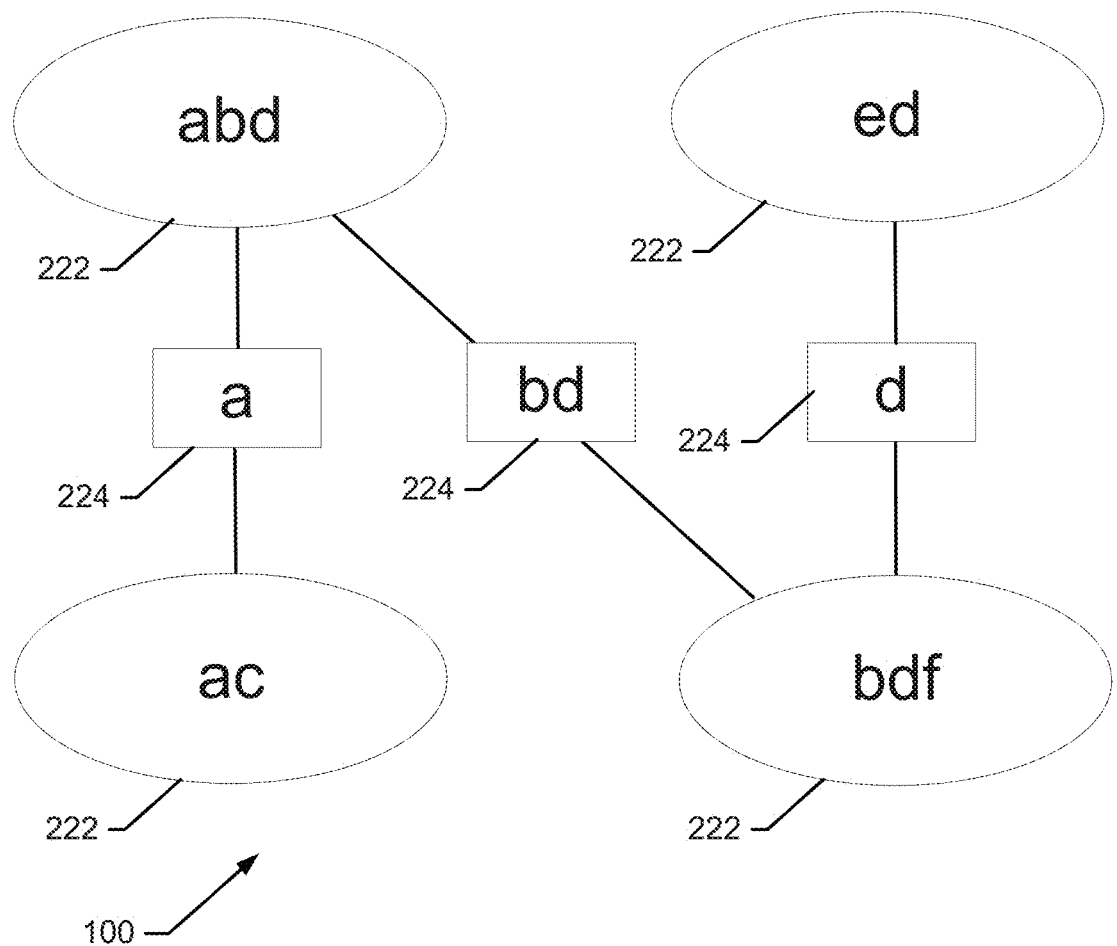
FIG. 7 illustrates a clique tree for the pruned mutual information graph of FIG. 4 according to an example embodiment.

After chordless cycles are repaired in the mutual information graph, a clique graph can be constructed. To form the clique graph, maximal cliques of the input graph become the nodes of the clique graph. For instance, in the graph in FIG. 5, the node set {abd} is a maximal clique, and therefore {abd} becomes a node in the clique graph. Two clique graph nodes are linked if the cliques have at least one underlying node in common. The link between overlapping nodes is also labeled as a separator set. To construct the clique tree 110 from the clique graph, a minimum spanning tree algorithm may be employed where link distances are measured in inverse of the separator set size. FIG. 7 is the clique tree 110 for the mutual information graph 200 of FIG. 4. The ovals 222 represent the maximal cliques, and the rectangles 224 are the separator sets on the links.

The resulting clique tree 110 can be used to construct a joint probability distribution, which is given by:

$$P(\text{data}) = \frac{\prod_{i \in V} P_i(C_i)}{\prod_{ij \in E} P_{ij}(S_{ij})}, \quad (4)$$

where $C_i$ and $S_{ij}$ respectively represent clique nodes and separator edges. For the clique tree 110 in FIG. 7, the joint probability is expressed as:

$$P(a, b, c, d, e, f) = \frac{P(a, c)P(a, b, d)P(b, d, f)P(e, d)}{P(a)P(b, d)P(d)}. \quad (5)$$

If any of the denominator factors have zero probability, the joint distribution is assigned probability of zero.

In equation (5), the left side of the equation is the probability of unseen data. In this example, the left side of the equation is the probability of a combination of six attributes, which have not yet been observed together within the data set in question. The numerator of the right side of the equation includes individual cliques or attribute groupings that are selected based on mutual information indicating combinations of attribute subsets. The denominator includes individual elements that are common elements from the cliques in the numerator (i.e., overlaps between cliques). Equation (5) therefore effectively infers the likelihood of a larger grouping (i.e., the left side of the equation) based on lower dimension objects (at the right side of the equation).

To address problems of the curse of dimensionality (which implies that in high dimensions, most of the data becomes equally anomalous) and data sparsity, the benefit of this decomposition should be made clear by considering that the number of possible combinations of variables in a distribution has an exponential dependence on the dimensionality of the distribution. While the joint probability on the left of equation (5) above has six arguments, the largest joint probability on the right has only three arguments (i.e., P(b,d,f) and P(a,b,d)).

One possible question regarding the joint probability distribution may be related to generalization capability. The problem of generalization is a familiar one from other areas of data analysis. For example, fitting data to a curve presents a trade-off between the accuracy of the fit and how well the fit explains the data points not yet measured. In the case of clique tree decomposition the problem of generalization is related to the extent of the pruning of the mutual information graph that forms the basis of the clique tree 110. To illustrate this point, consider two extreme cases in reference to FIG. 8A (Case 1) and 8B (Case 2).

Figure 8A:
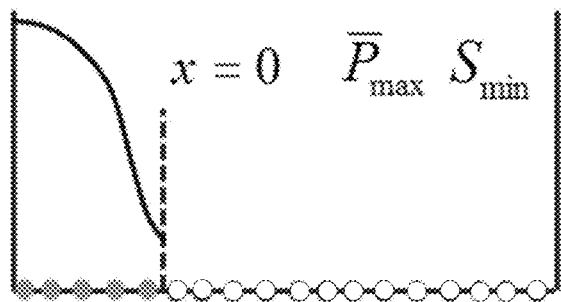
FIG. 8A illustrates a joint probability distribution where all mutual information links are retained in accordance with an example embodiment.

Case 1: If the mutual information threshold is set to 0, all of the mutual information links are retained. The resulting probability distribution is the full joint distribution. The probability of any data point becomes equal to how frequently that data point is observed, and any data point not previously seen will be considered to have probability of zero. FIG. 8A illustrates a type of distribution consistent with case 1. In short, selection of a 0 threshold is an overfitting of the data. This example illustrates why high dimensionality and data sparsity is clearly problematic for modeling a probability distribution, since there are presumably many combinations of attributes that are not inherently anomalous, but are assigned a zero probability.

Figure 8B:
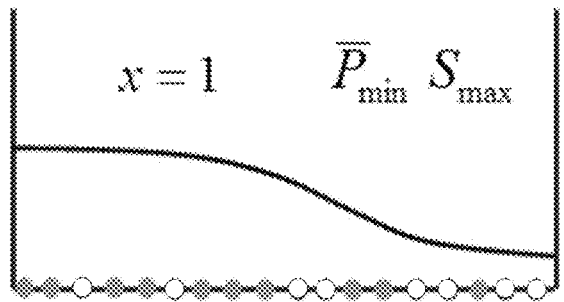
FIG. 8B illustrates a joint probability distribution where all mutual information links are removed in accordance with an example embodiment.

Case 2: If the threshold is set to 1, all of the mutual information links are removed. Removing all mutual information links will correspond to fitting the data assuming that all dimensions are independent. The probability values of both observed data and all other possible attribute combinations are nonzero. On the downside, treating attributes as independent means the probability estimates are not going to be accurate for any data point, including the observed values. This situation is represented in FIG. 8B. Accordingly, in reference to FIG. 8A, it can be appreciated that setting a mutual information threshold x=0 results in unobserved data (hollow circles) having zero probability. The average probability (P) of observed data (filled circles) is maximized, and entropy (S) is minimized. In reference to FIG. 8B, setting x=1 results in all data points (observed and unobserved data) being assigned positive probability, which maximizes the entropy.

Neither of these extreme cases is satisfactory. Thus, it may be desirable to choose a threshold that attempts to balance the competing goals of fidelity to observed data, and allowance for previously unseen data. In order to choose an optimal threshold x, P(x|D) may be maximized where D is the set of observed data. Equivalently, the problem could be expressed as maximizing $P(G_i|D)$, where the $\{G_i\}$ is the set of possible clique trees. This is a finite set of clique trees, with a corresponding set of thresholds $\{x_i\}$. Using Bayes' Theorem, $$P(x|D) = \frac{P(D|x)P(x)}{P(D)} \quad (6)$$

may be written for this situation.

The prior P(x) can be assumed to be uniform, and P(D) is a normalization factor independent of x, so maximizing P(D|x) may be desired. However, even though it may be desirable to maximize probability of the observed data, it may not be desirable to choose the best clique tree based on the set of all observed data. This is because the probability P(D|x) is the product of the individual data probabilities, and this product will be maximized at x=0. Thus, it may be desirable to force the distribution to assign mass to a more expansive set of data points than those on which the system is trains on, but not across the entire attribute space. Accordingly, the solution may be to divide the observed data into a training set and a test set. With this partition, the quantity that is desirable to maximize may be given by:

$$P(D|x) = P(D_{Train}|x)P(D_{Test}|x). \quad (7)$$

Figure 9A:
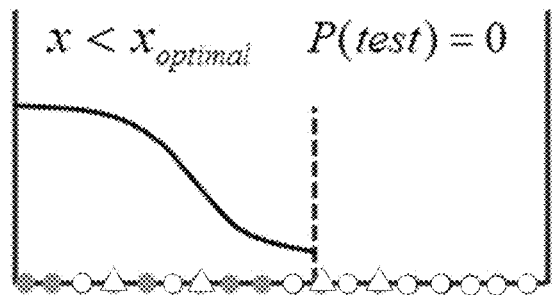
FIGS. 9A and 9B illustrate graphs for a joint probability distribution with respective different thresholds set for retaining mutual information links in accordance with an example embodiment.
Figure 9B:
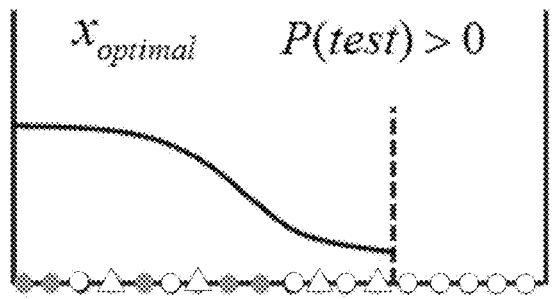

If any of the test data is assigned zero probability, the right side of equation (7) becomes zero, and the corresponding x will therefore not be chosen as optimal. The idea is shown pictorially and will be described in reference to FIGS. 9A and 9B. Triangular shaped points represent test data. As can be appreciated from FIG. 9A, if the threshold is set too low, some of the test data will have a probability of zero. This threshold is rejected by maximizing P(D|x) in equation (7). Thus, as shown in FIG. 9B, the threshold may be set larger (e.g., just large enough to assign positive probability to the training and test data) to improve results.

When the mutual information threshold is low, the distribution will accommodate the training data, but the distribution may be too compact to explain the test data. At the optimal threshold, the distribution assigns positive probability to the training data and the test data, and possibly also to some of the possible data points which are still unseen. If the threshold is higher than optimal, P(D|x) will start to decrease, since more of the mass is assigned to the unobserved data. In summary, the correct value of x therefore explains the training data, and the correct value of x also accommodates the test data (so that plausible unseen data is allowed), but does not spread the distribution needlessly wide over the total space of attribute combinations.

Figure 10:
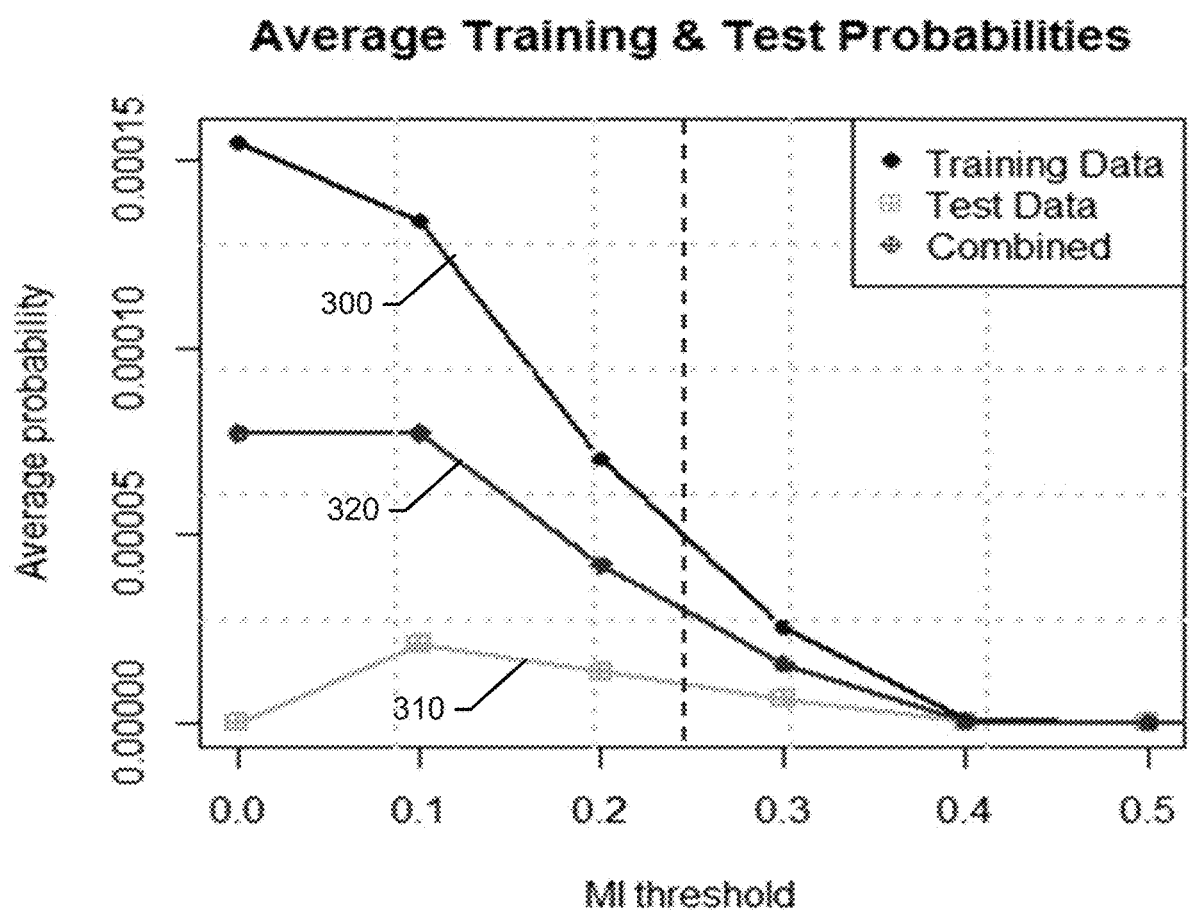
FIG. 10 illustrates an average probability of training data, test data and all observed data combined, as a function of mutual information threshold in accordance with an example embodiment.
Figure 11:
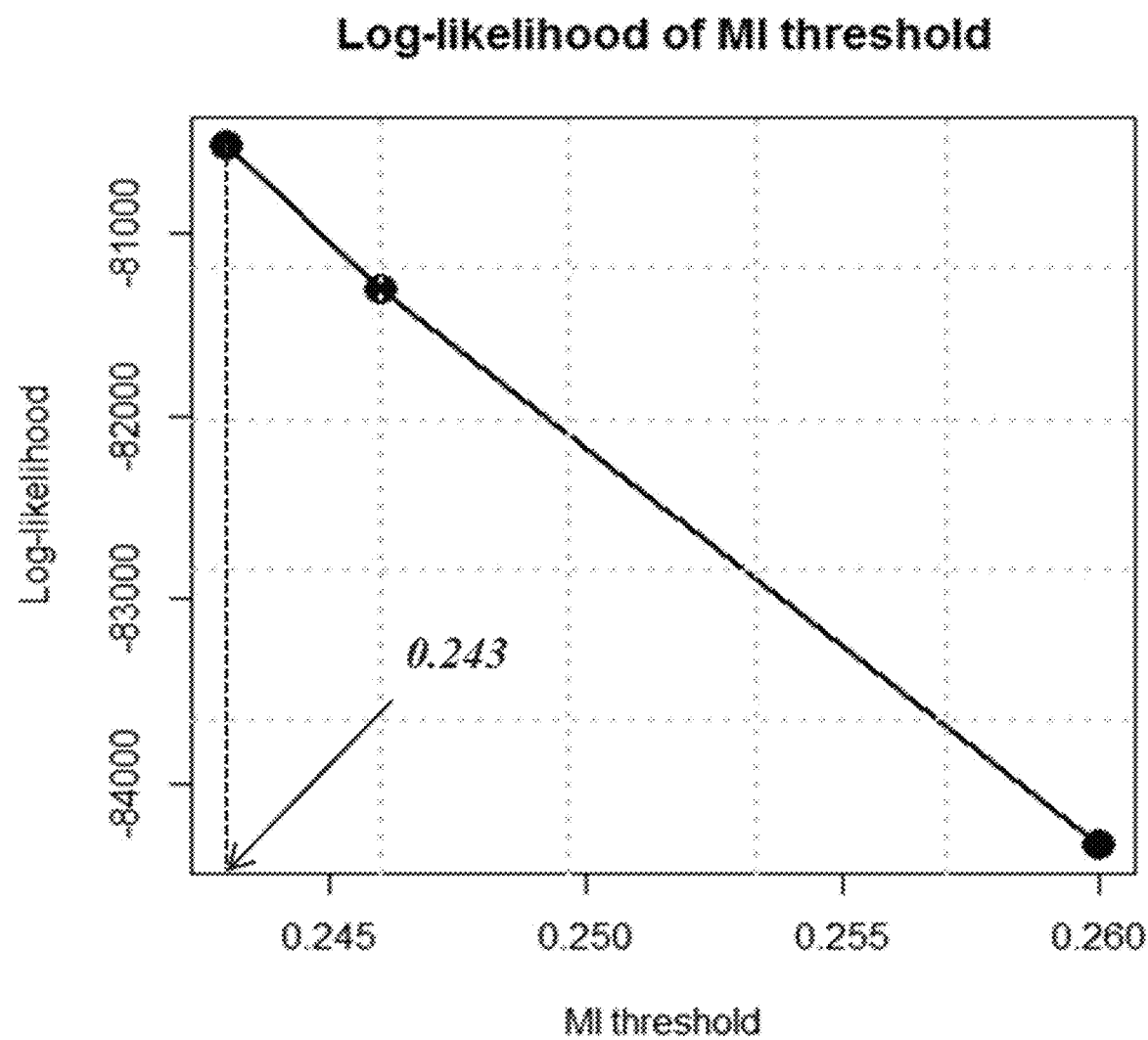
FIG. 11 illustrates a plot of log(P(D|x)) as a function of mutual information threshold in accordance with an example embodiment.

FIG. 10 illustrates an average probability of training data 300, test data 310 and all observed data combined 320, as a function of mutual information threshold. For the mushroom data set discussed above, the data may be randomly divided into training and test sets, with 80% of the data assigned to the training set. The average probability of observed data decreases as x increases (as shown in FIG. 11) since more of the mass is shifted onto unobserved data points. FIG. 11 illustrates a plot of log(P(D|x)) as a function of mutual information threshold.

Maximizing P(D|x), which is the quantity in equation (7), the optimal threshold for the mushroom data may be found to be x=0.243. The plot of P(D|x) is shown in FIG. 11. For values of x less than the threshold of 0.243, P(D|x)=0 since the test data is not accounted for; this is the idea shown in FIG. 9A. As x increases past 0.243, P(D|x) decreases monotonically. It is possible to repeat the analysis for multiple partitioning of the data into test and training sets to improve robustness of the threshold determination. An interesting property of this solution is related to the entropy of the clique tree 110. Entropy is a measure of randomness of a distribution and clique tree entropy can be calculated in terms of vertex and edge clique entropies:

$$S = \sum_{i \in V} S(C_i) - \sum_{ij \in E} S(C_{ij}). \quad (8)$$

Figure 12:
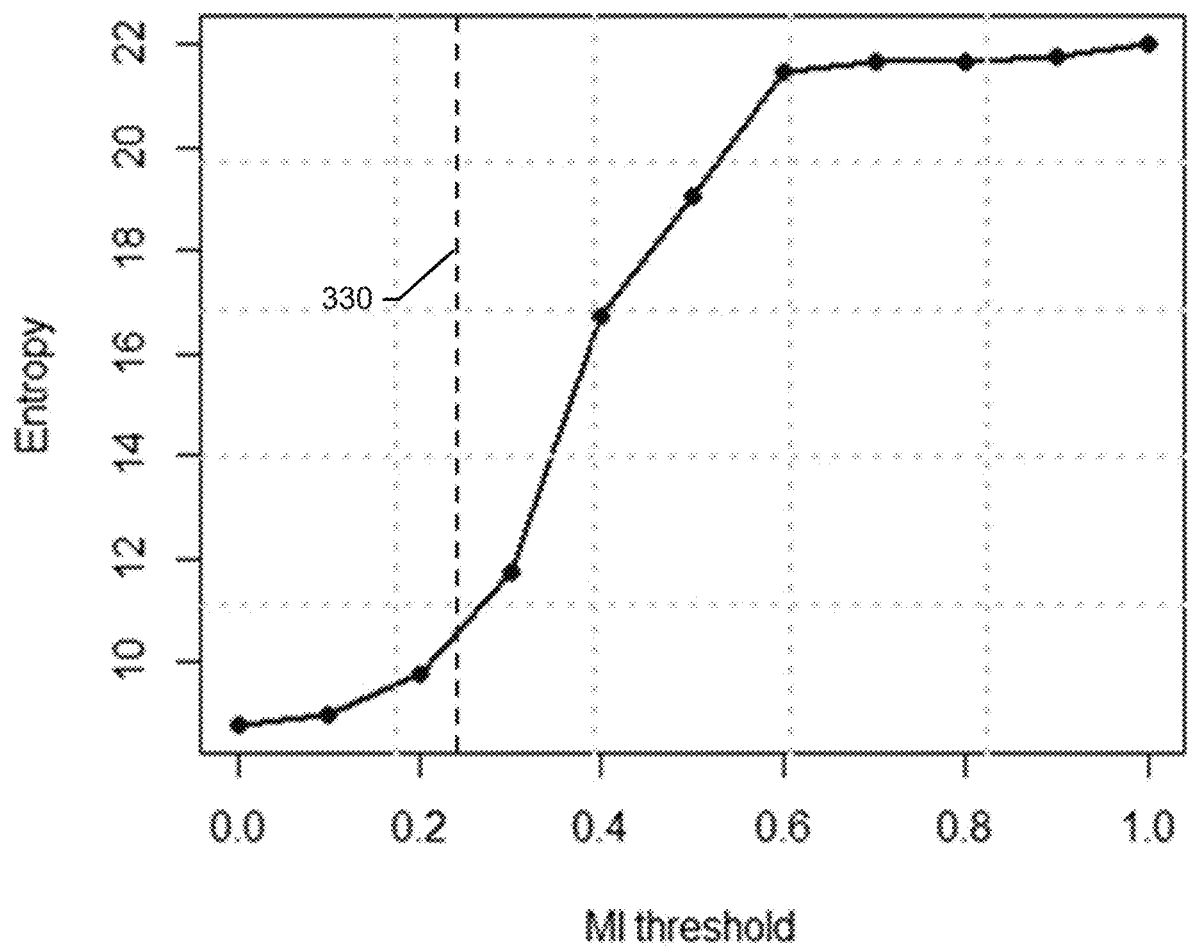
FIG. 12 illustrates a plot of entropy of the clique tree probability distribution as a function of mutual information threshold in accordance with an example embodiment.

This expression reduces calculation of entropy for a high dimensional distribution to calculation of individual clique entropies which are simpler to calculate. As expected, the entropy of the clique tree increases as the threshold x increases (as shown in FIG. 12). In the plot of FIG. 12, the dashed line 330 marks the location of the optimal mutual information threshold where a feasible region for threshold is to the right of the boundary defined by the dashed line 330. The plot of FIG. 12 therefore shows entropy of the clique tree probability distribution as a function of mutual information threshold.

Figure 13:
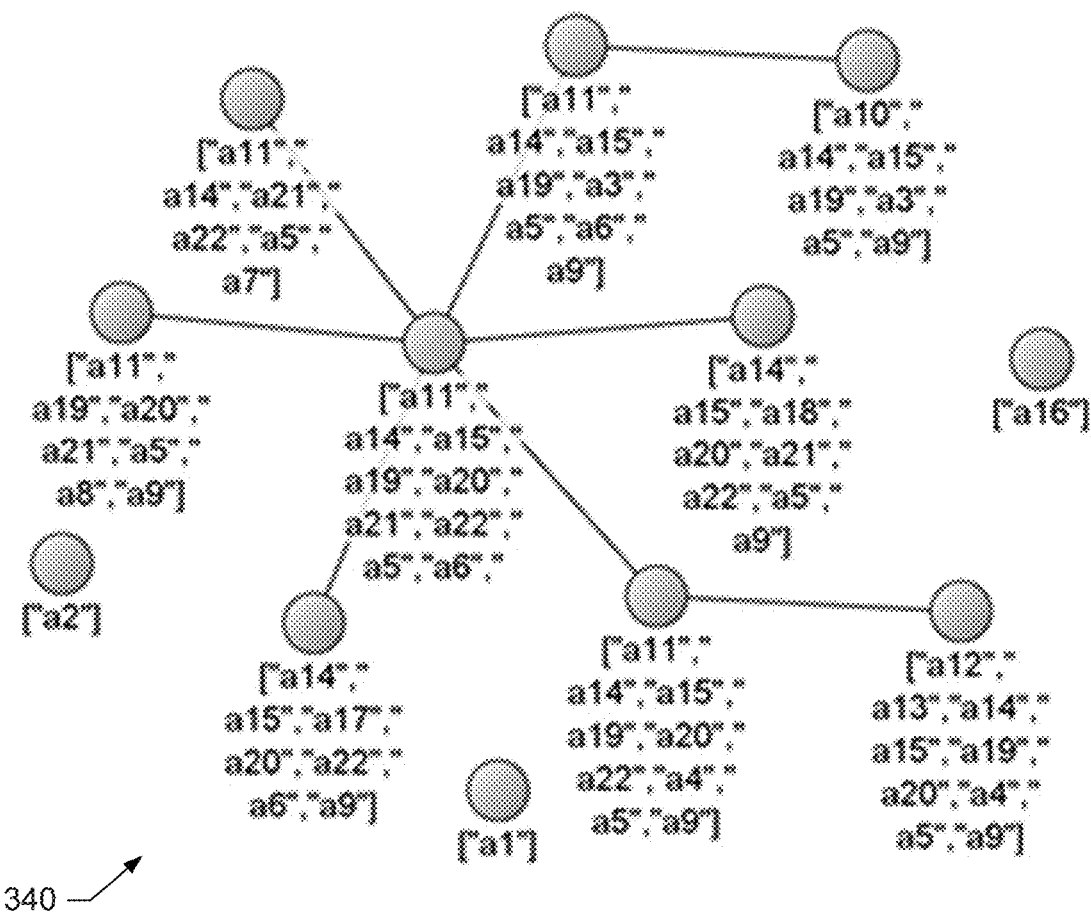
FIG. 13 illustrates a clique tree structure that corresponds to an optimal threshold of 0.243 in accordance with an example embodiment.

As the result shown in FIG. 12 indicates the optimal threshold that maximizes the posterior probability corresponds to minimum entropy solution in the domain where the test data has non-zero probability. A clique tree structure 340 that corresponds to the optimal threshold of 0.243 is shown in FIG. 13.

Each node (i.e., each circle) represents a clique, and is labeled with the attributes that comprise the clique. Two cliques are linked if they have at least one attribute in common. A few attributes are independent of all the others (the single attributes on isolated nodes), but the typical clique size is in the range of 6-10 attributes. The separator sets (the overlapping attributes between cliques) are not displayed in this figure; however, many of the cliques do overlap.

The probability model derived above may be used to choose a single optimal clique tree decomposition. An alternative to using a single clique tree is to use Bayesian model averaging. According to Bayesian model averaging, given a set of alternative clique trees $G_i$, the probability of a data point is given by:

$$P(d) = \sum_i P(G_i|D)P(d|G_i) \quad (9)$$

where $P(G_i|D)$ is given by:

$$P(G_i|D) = \frac{P(D|G_i)P(G_i)}{P(D)}. \quad (10)$$

An advantage of the Bayesian model averaging approach is related to incorporating alternative domain expert knowledge in a systematic way. There may be situations where the available data is too sparse to provide sufficient evidence for mutual dependencies, but these dependencies may be known to a domain expert. In such situations, the mutual information graph can be modified by an analyst to incorporate analyst knowledge. This is an important flexibility of the clique tree approach as it provides a framework where analyst domain knowledge and data can be fused seamlessly. Furthermore in situations where competing views exist, Bayesian model averaging can be used to construct a solution that takes different versions of the mutual information graph into account.

Using the clique tree decomposition, it may be possible to examine the behavior of data from the perspectives of clustering and anomaly detection. Unlike common clustering approaches to categorical data where the goal is to find one optimal clustering, clique tree representation promotes alternative clusterings based on subspaces defined by cliques that are formed by strongly coupled attributes.

Figure 14:
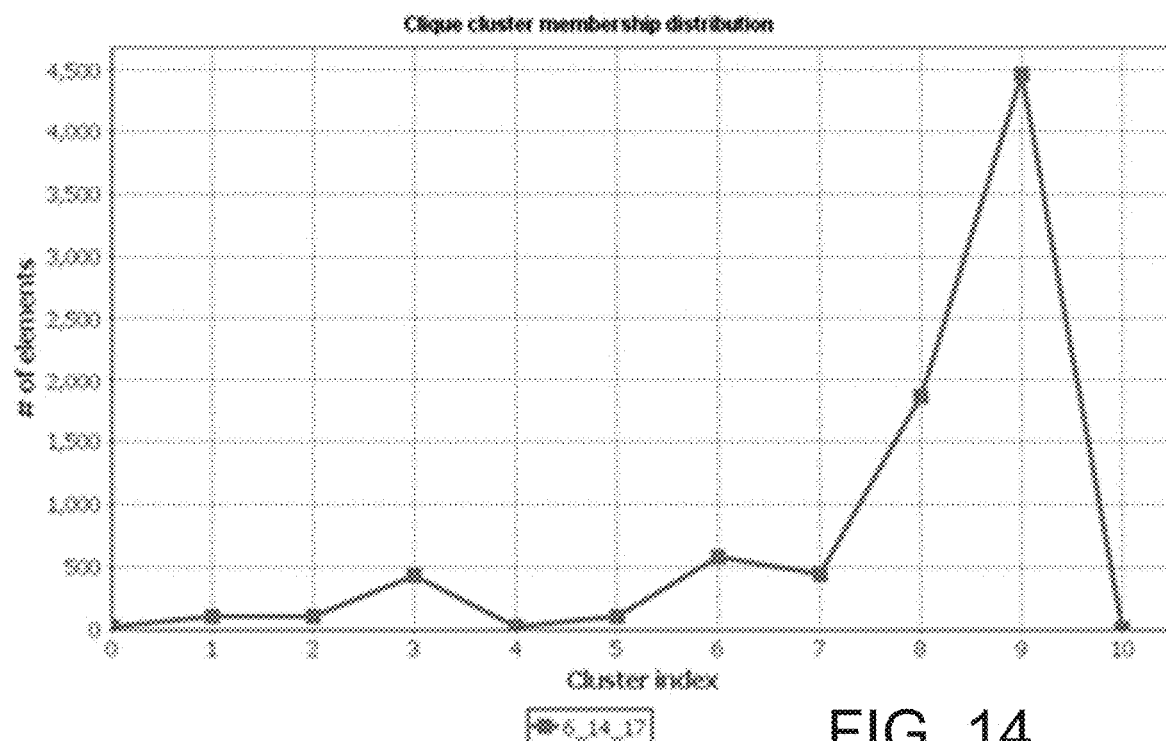
FIG. 14 illustrates a plot of clique cluster membership distribution in accordance with an example embodiment.

For example, in the mushroom data, consider the clique $C_{6,14,17}$ formed by strongly coupled attributes (6,14,17) whose value multiplicities are (3,9,3). Based on the multiplicities, there are 81 possible combinations for attributes in the clique subspace. But when the mushrooms are clustered according to their attribute combinations, only 11 clusters may be found, as shown in FIG. 14. Furthermore, it may be found that a majority of mushrooms fall into only 5 of those clusters. Therefore, clique decomposition provides a natural way to cluster data, where each clique provides a clique-specific clustering.

Because clique based clustering assigns data to clusters based on their common clique attributes, the probability of a data point is directly described by the size of the cluster the data belongs to in clique specific clustering. Referring again to FIG. 14, clustering the mushroom data based on clique $C_{6,14,17}$ suggests evidence of anomalous mushrooms that belong to clusters 0, 4, and 10. Therefore, in a probability decomposition, it may be possible to see that the proposed decomposition provides insight as to why a data point is normal or anomalous, by examining the probability values of the factors that comprise the right hand side of equation (5).

One of the difficulties in (unsupervised) anomaly detection is the lack of a ground truth. There is no single right answer, and performance of anomaly detection is therefore harder to adjudicate than classification, which can train from labeled classes. Approaches to anomaly detection in categorical attribute spaces must also overcome the lack of a distance metric. Example embodiments employ a strategy for determining probabilities that are estimated using decomposition into lower dimensional spaces using groups of related attributes. To accomplish this, example embodiments optimize overlapping subsets of attributes in the probability decomposition using a clique tree structure. Although example embodiments can automate the derivation of the optimal threshold and thus the probability distribution, the user may choose to shift the threshold, or may combine the results of using different thresholds by using the Bayesian model averaging. In this way the user's domain knowledge may be allowed to influence the probability estimations.

Another key statistical operation on data involves classification. The joint probability representation based on clique tree decomposition can be used for classification purposes. To demonstrate a real world example of how clique tree analysis can be used for classification purposes, consider again the mushroom data set discussed above. Each mushroom may be labeled as edible or poisonous and this labeling can be used to divide mushrooms into two classes. The goal in using the clique tree approach is not necessarily to improve on other analytical results, but to demonstrate that while producing a solution to the anomaly detection problem, the clique tree approach also provides excellent classification results.

A classification test on the mushroom data set may be performed by training the clique tree using 80% of the observed data and performing tests using the remaining 20% of the data. The decision rule used in classification may be based on the ratio of probabilities that a mushroom belongs to an edible group (E) versus poisonous group (P):

$$\frac{P(P|d)}{P(E|d)} = \frac{P(d|P)P(P)}{P(d|E)P(E)}. \quad (11)$$

In the above equation (11), d is a data point (a single mushroom), and P and E represent the poisonous and edible categories, respectively.

Figure 15:
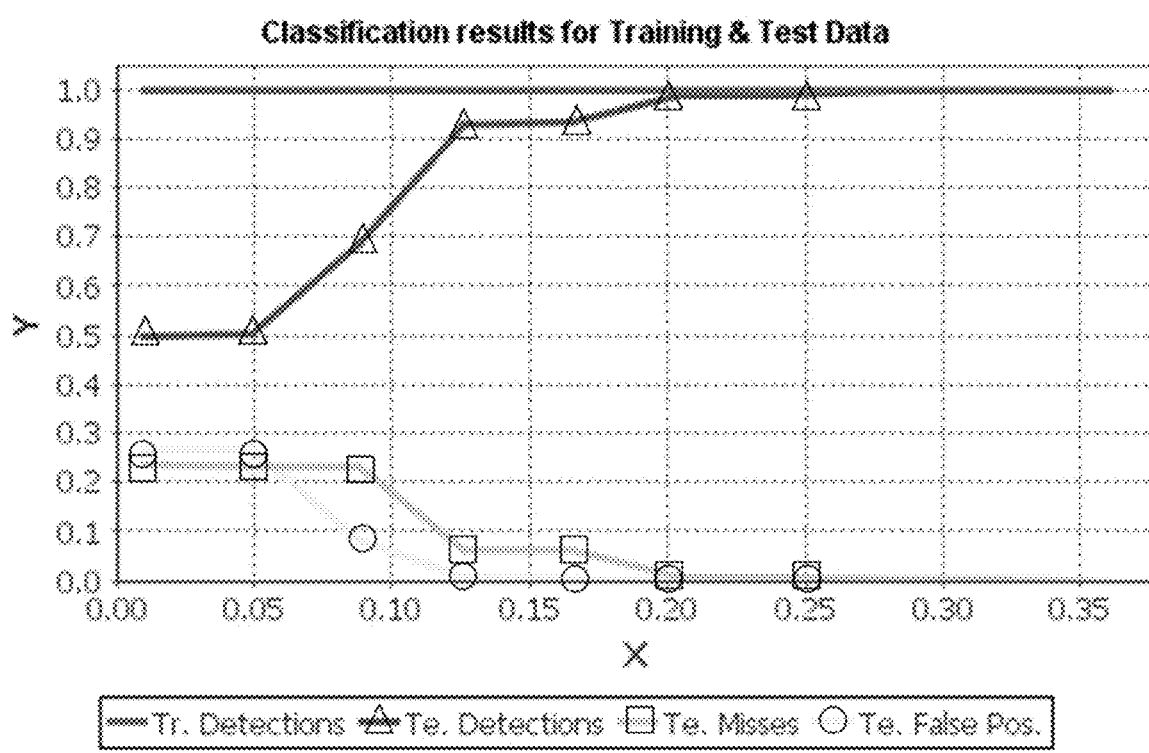
FIG. 15 illustrates classification accuracy and its dependence on the mutual information threshold according to an example embodiment.

The classification accuracy and its dependence on the mutual information threshold are presented in FIG. 15. As can be seen in FIG. 15, classification result accuracy goes from random to 100% as the mutual information threshold (shown on the x-axis) is increased from 0 up to around 0.25. As expected, when the mutual information threshold is low, the probability model is close to the full joint distribution, which corresponds to the case of over fitting. In this limit, the unknown mushrooms are decided effectively with a coin toss. As the mutual information threshold is increased to around 0.25 (essentially the threshold cutoff derived above), the classification accuracy approaches 100%.

As described herein, a clique tree approach to categorical data analysis, with particular focus on the problem of learning of clique tree structure for anomaly detection, can provide the ability to detect anomalies, classify previously unseen data accurately, perform probability modeling, etc. The clique tree approach produces a probability model which exploits variable dependencies and independencies, and provides clear anomaly signatures. It may also be possible to use a Bayesian approach to determine an optimal threshold that specifies the structure of a clique tree which can be used to infer probabilities of data. Results show that optimal clique tree corresponds to a minimum entropy distribution. The further application of the clique tree approach to a classification problem demonstrates how the clique tree representation, which does not make an assumption about a distance metric, provides a powerful tool for solving common data mining problems.

Figure 16:
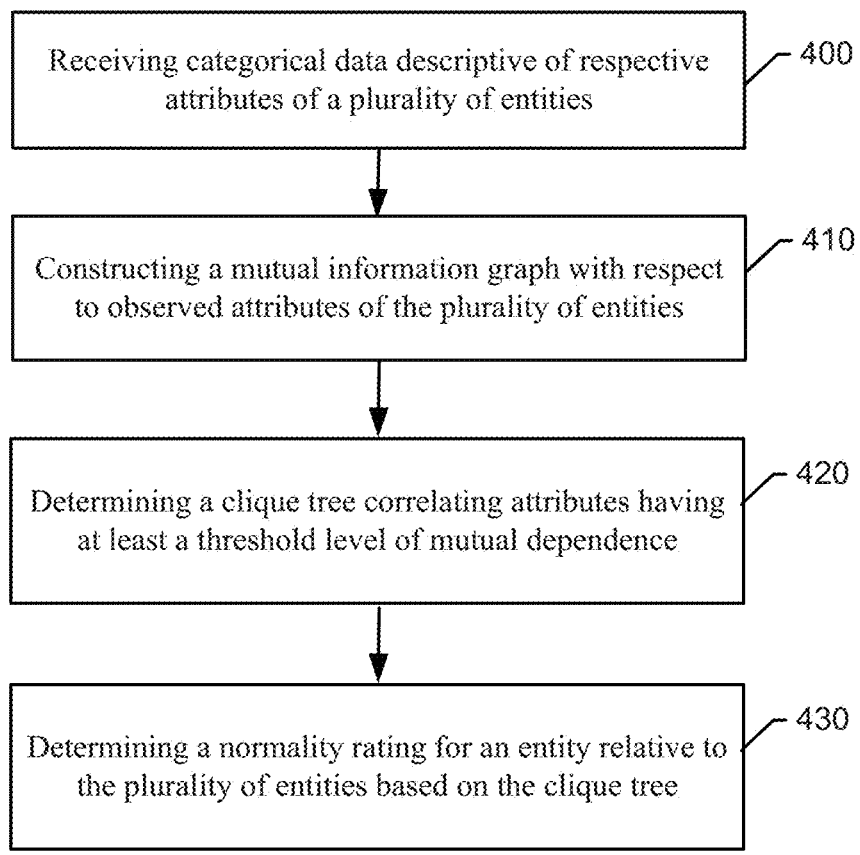
FIG. 16 illustrates a method for detection of an anomaly in accordance with an example embodiment.

From a technical perspective, the normality determiner 44 described above may be used to support some or all of the operations described above. As such, the platform described in FIGS. 1-2 may be used to facilitate the implementation of several computer program and/or network communication based interactions. As an example, FIG. 16 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user terminal (e.g., application server 40, client 20 and/or the like) and executed by a processor in the user terminal. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 16, may include receiving categorical data descriptive of respective attributes of a plurality of entities at operation 400. The method may further include constructing a mutual information graph with respect to observed attributes of the plurality of entities at operation 410. In some cases, the method may begin with operation 410 with respect to categorical data that is not necessarily transmitted for reception, but is instead already stored or otherwise in the possession of the performer of the method. The method may also include determining a clique tree correlating attributes having at least a threshold level of mutual dependence at operation 420, and determining a normality rating for an entity relative to the plurality of entities based on the clique tree at operation 430. As mentioned above, the mutual information graph is one of many possible ways to utilize a correlation metric with respect to observed attributes of the plurality of entities. Thus, in some cases, operation 410 could be seen to be a more specific example of the general case of utilizing a correlation metric. In such a more generalized example, determining the clique tree may be accomplished by defining entity groupings with correlated attributes based on the correlation metric.

In some embodiments, the features or operations described above may be augmented or modified, or additional features or operations may be added. These augmentations, modifications and additions may be optional and may be provided in any combination. Thus, although some example modifications, augmentations and additions are listed below, it should be appreciated that any of the modifications, augmentations and additions could be implemented individually or in combination with one or more, or even all of the other modifications, augmentations and additions that are listed. As such, for example, the categorical data may be high dimensional data, and determining the normality rating may include determining a joint probability distribution to determine a probability of the entity based on lower dimension subsets of the observed attributes. In some cases, the entity may be described by a combination of attributes, and the combination of attributes may not have been previously observed. In an example embodiment, determining the joint probability distribution may include determining a ratio of probabilities of cliques defined by common attribute groupings to probabilities of overlapping elements from the cliques. In some cases, the plurality of entities may each be associated with a particular classification of entities, and the normality rating may define a degree to which the entity fits within the particular classification. In an example embodiment, determining the clique tree may include enabling a user to adjust the mutual information graph. In some cases, the method may further include automatically determining the threshold level by partitioning the categorical data set randomly into a training data set and a test data set, and optimizing the threshold level by maximizing a product of probabilities of the training data set and the test data set. In an example embodiment, the method may further include generating an output to a user terminal, where the output indicates whether the entity is an anomaly, a classification of the entity, or an index of data to which the entity is similar. In some cases, the output may be an alarm, an alert, or an instruction to take an action relative to the entity.

In an example embodiment, an apparatus for performing the method of FIG. 16 above may comprise a processor (e.g., the processor 52) or processing circuitry configured to perform some or each of the operations (400-440) described above. The processor may, for example, be configured to perform the operations (400-440) by performing hardware implemented logical functions, executing stored instructions, or executing algorithms for performing each of the operations. In some embodiments, the processor or processing circuitry may be further configured for the additional operations or optional modifications to operations 400 to 440 that are discussed above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An apparatus comprising processing circuitry configured to execute instructions that, when executed, cause the apparatus to:
construct a mutual information graph for categorical data with respect to observed attributes of a plurality of entities described in terms of respective ones of the observed attributes by the categorical data, wherein each observed attribute corresponds to an attribute node of the mutual information graph, wherein the attribute nodes of the mutual information graph are associated via links between the attribute nodes, and wherein the links between the attribute nodes are weighted based on a degree of dependency between the attribute nodes;
determine a clique tree correlating the observed attributes, wherein being configured to determine the clique tree comprises being configured to:
prune selected links of the mutual information graph based on weightings of the selected links and application of a link weight retention threshold to form a pruned mutual information graph;
identify a chordless cycle within the pruned mutual information graph, the chordless cycle being defined as having no attribute node on a periphery of the pruned mutual information graph with a direct link to a non-adjacent attribute node, and
in response to identifying the chordless cycle within the pruned mutual information graph, introduce at least one non-adjacent link to an attribute node on the periphery of the pruned mutual information graph, the non-adjacent link being a link between the attribute node on the periphery of the pruned mutual information graph and a different attribute node that is not directly linked to the attribute node on the periphery of the pruned mutual information graph; and
determine a normality rating for an entity relative to the plurality of entities based on the clique tree.

2. The apparatus of claim 1, wherein the categorical data is high dimensional data, and wherein determining the normality rating comprises determining a joint probability distribution to determine a probability of the entity based on lower dimension subsets of the observed attributes.

3. The apparatus of claim 2, wherein the entity is described by a combination of attributes, and the combination of attributes has not been previously observed.

4. The apparatus of claim 2, wherein determining the joint probability distribution comprises determining a ratio of probabilities of cliques defined by common attribute groupings to probabilities of overlapping elements from the cliques.

5. The apparatus of claim 1, wherein the plurality of entities are each associated with a particular classification of entities, and wherein the normality rating defines a degree to which the entity fits within the particular classification.

6. The apparatus of claim 1, wherein determining the clique tree comprises enabling a user to adjust the pruned mutual information graph.

7. The apparatus of claim 1, wherein the processing circuitry is further configured to automatically determine the link weight retention threshold by partitioning the categorical data randomly into a training data set and a test data set, and optimizing the link weight retention threshold by maximizing a product of probabilities of the training data set and the test data set.

8. The apparatus of claim 1, wherein the processing circuitry is further configured to generate an output to a user terminal, the output indicating whether the entity is an anomaly, a classification of the entity, or an index of data to which the entity is similar.

9. The apparatus of claim 8, wherein the output comprises an alarm, an alert, or an instruction to take an action relative to the entity.

10. A method executable via operation of configured processing circuitry, the method comprising:
constructing a mutual information graph for categorical data with respect to observed attributes of a plurality of entities described in terms of respective ones of the observed attributes by the categorical data, wherein each observed attribute corresponds to an attribute node of the mutual information graph, wherein the attribute nodes of the mutual information graph are associated via links between the attribute nodes, and wherein the links between the attribute nodes are weighted based on a degree of dependency between the attribute nodes;
determining a clique tree correlating the observed attributes having at least a threshold level of mutual dependence, wherein determining the clique tree includes:
prune selected links of the mutual information graph based on weightings of the selected links and application of a link weight retention threshold to form a pruned mutual information graph,
identifying a chordless cycle within the pruned mutual information graph, the chordless cycle being defined as having no attribute node on a periphery of the pruned mutual information graph with a direct link to a non-adjacent attribute node, and
in response to identifying the chordless cycle within the pruned mutual information graph, introducing at least one non-adjacent link to an attribute node on the periphery of the pruned mutual information graph, the non-adjacent link being a link between the attribute node on the periphery of the pruned mutual information graph and a different attribute node that is not directly linked to the attribute node on the periphery of the pruned mutual information graph; and
determining a normality rating for an entity relative to the plurality of entities based on the clique tree.

11. The method of claim 10, wherein the categorical data is high dimensional data, and wherein determining the normality rating comprises determining a joint probability distribution to determine a probability of the entity based on lower dimension subsets of the observed attributes.

12. The method of claim 11, wherein the entity is described by a combination of attributes, and the combination of attributes has not been previously observed.

13. The method of claim 11, wherein determining the joint probability distribution comprises determining a ratio of probabilities of cliques defined by common attribute groupings to probabilities of overlapping elements from the cliques.

14. The method of claim 10, wherein the plurality of entities are each associated with a particular classification of entities, and wherein the normality rating defines a degree to which the entity fits within the particular classification.

15. The method of claim 10, wherein determining the clique tree comprises enabling a user to adjust the pruned mutual information graph.

16. The method of claim 10, further comprising automatically determining the link weight retention threshold by partitioning the categorical data randomly into a training data set and a test data set, and optimizing the link weight retention threshold by maximizing a product of probabilities of the training data set and the test data set.

17. The method of claim 10, further comprising generating an output to a user terminal, the output indicating whether the entity is an anomaly, a classification of the entity, or an index of data to which the entity is similar.

18. The method of claim 17, wherein the output comprises an alarm, an alert, or an instruction to take an action relative to the entity.

19. A method executable via operation of configured processing circuitry, the method comprising:
    utilizing a correlation metric to construct an input graph with respect to observed attributes of a plurality of entities described in terms of respective ones of the observed attributes in categorical data, wherein each observed attribute corresponds to an attribute node of the input graph, wherein the attribute nodes of the input graph are associated via links between the attribute nodes, and wherein the links between the attribute nodes are weighted based on a degree of dependency between the attribute nodes;
    determining a clique tree defining entity groupings with correlated observed attributes based on the correlation metric, wherein determining the clique tree includes:
        prune selected links of the input graph based on weightings of the selected links and application of a link weight retention threshold to form a pruned input graph,
        identifying a chordless cycle within the pruned input graph, the chordless cycle being defined as having no attribute node on a periphery of the pruned input graph with a direct link to a non-adjacent attribute node, and
        in response to identifying the chordless cycle within the pruned input graph, introducing at least one non-adjacent link to an attribute node on the periphery of the pruned input graph, the non-adjacent link being a link between the attribute node on the periphery of the pruned input graph and a different attribute node that is not directly linked to the attribute node on the periphery of the pruned input graph; and
    determining a normality rating for an entity relative to the plurality of entities based on the clique tree.

20. The method of claim 19, wherein utilizing the correlation metric comprises constructing the input graph as a mutual information graph with respect to observed attributes of the plurality of entities.

* * * * *